US012790146B2

(12) United States Patent
Grieshop et al.

(10) Patent No.: US 12,790,146 B2
(45) **Date of Patent: *Nov. 10, 2026**

(54) AUTOMATED GRAIN UNLOADING SYSTEM AND RELATED METHODS

(71) Applicant: J. & M. Manufacturing Co., Inc., Ft. Recovery, OH (US)

(72) Inventors: Dustan Grieshop, Ft. Recovery, OH (US); Sean Kahlig, Ft. Recovery, OH (US); Ryan Kaiser, Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 43 days.

This patent is subject to a terminal disclaimer.

(21) Appl. No.: 18/793,594

(22) Filed: Aug. 2, 2024

(65) Prior Publication Data

US 2026/0035191 A1 Feb. 5, 2026

Related U.S. Application Data

(63) Continuation of application No. PCT/US2023/012206, filed on Feb. 2, 2023.

(Continued)

(51) Int. Cl.

| | |
|---|---|
| ***B65G 69/04*** | (2006.01) |
| ***A01D 90/10*** | (2006.01) |
| ***B65G 65/00*** | (2006.01) |

(52) U.S. Cl.

CPC ............. *B65G 69/04* (2013.01); *A01D 90/10* (2013.01); *B65G 65/005* (2013.01); *B65G 2203/0283* (2013.01); *B65G 2814/0247* (2013.01)

(58) Field of Classification Search

CPC .................. B65G 69/04; B65G 65/005; B65G 2203/0283; B65G 2814/0247; A01D 90/10

See application file for complete search history.

(56) References Cited

U.S. PATENT DOCUMENTS

| | | | |
|---|---|---|---|
| 4,342,383 | A | 8/1982 | Burnett |
| 4,415,303 | A | 11/1983 | Westendorf |

(Continued)

FOREIGN PATENT DOCUMENTS

| | | | |
|---|---|---|---|
| GB | 2216763 | A | 10/1989 |
| WO | 2008024910 | A2 | 2/2008 |
| WO | 2014062785 | A1 | 4/2014 |

OTHER PUBLICATIONS

J.&M. Mfg. Co., Inc., Auto Gate Shut Off Installation Manual, Rev2.26.2014, 12 pages.

(Continued)

*Primary Examiner* — Gertrude Arthur Jeanglaude

(74) *Attorney, Agent, or Firm* — Rooney IP, LLC

(57) ABSTRACT

An automated grain unloading system includes at least one sensor and a processor. The at least one sensor is configured to detect an interface between an upper surface of a grain mound in the receiving container and an interior surface of a wall of the receiving container, at least a portion of an upper edge of the wall, and an orientation of the grain transfer element. The processor is configured to compare the detected interface and the detected portion of the upper edge to the detected orientation of the grain transfer element, and to control the operation of the grain transfer element to direct a transfer of grain from the supplying container to the receiving container based at least in part on a result of the comparison of the detected interface and the detected portion of the upper edge to the detected orientation of the grain transfer element.

47 Claims, 10 Drawing Sheets

Related U.S. Application Data

(60) Provisional application No. 63/306,816, filed on Feb. 4, 2022.

(56) References Cited

U.S. PATENT DOCUMENTS 5,340,265 A 8/1994 Grieshop
5,575,316 A 11/1996 Poliklas
5,675,056 A 10/1997 Vance
5,957,331 A 9/1999 Minor et al.
6,216,071 B1 4/2001 Motz
6,296,435 B1 10/2001 Wood
6,776,569 B1 8/2004 McMahon et al.
7,198,449 B2 * 4/2007 Dillon ................ A01D 41/1208 414/813
7,862,286 B2 1/2011 Mackin
7,874,899 B2 1/2011 Mackin
7,877,181 B2 1/2011 Chervenka et al.
7,938,613 B2 5/2011 Yoder
8,032,255 B2 10/2011 Phelan et al.
8,126,620 B2 2/2012 Ringwald et al.
8,366,372 B2 2/2013 Yoder
8,414,246 B2 4/2013 Tobey
8,499,537 B2 8/2013 Correns et al.
8,656,693 B2 2/2014 Madsen et al.
8,695,396 B2 4/2014 Landphair et al.
8,702,368 B2 4/2014 Van Mill
8,967,691 B2 3/2015 Mueller et al.
8,981,949 B2 3/2015 Ricketts et al.
9,010,819 B2 4/2015 Mueller et al.
9,085,381 B2 7/2015 Gengerke
9,113,598 B2 8/2015 Wood
9,119,342 B2 9/2015 Bonefas
9,185,845 B2 11/2015 Van Mill et al.
9,187,259 B2 11/2015 Van Mill et al.
9,272,853 B2 3/2016 Van Mill et al.
9,326,444 B2 5/2016 Bonefas
9,596,805 B2 3/2017 Van Mill et al.
9,596,809 B2 3/2017 Van Mill et al.
9,604,785 B1 3/2017 Gaerke
9,706,713 B2 7/2017 Van Mill
9,723,789 B2 8/2017 Van Mill
9,763,389 B2 9/2017 Bump et al.
9,873,570 B2 1/2018 Van Mill et al.
9,949,435 B2 4/2018 Banks, Jr. et al.
10,015,928 B2 7/2018 Nykamp et al.
10,028,434 B2 7/2018 Van Mill et al.
10,028,441 B2 7/2018 Van Mill et al.
10,064,335 B2 9/2018 Byttebier et al.
10,152,891 B2 12/2018 Rusciolelli et al.
10,160,367 B2 12/2018 Van Mill
10,426,092 B2 10/2019 Van Mill
10,485,177 B2 11/2019 Bump et al.
10,542,676 B2 1/2020 Van Mill
10,647,240 B1 5/2020 Grieshop et al.
10,743,474 B1 8/2020 Schlimgen
10,765,063 B2 9/2020 Van Mill et al.
10,807,812 B2 10/2020 Thomson et al.
11,008,177 B2 5/2021 Banthia
11,104,258 B2 8/2021 Grieshop et al.
11,140,829 B2 10/2021 Van Mill
11,343,971 B2 5/2022 Van Mill
11,457,562 B2 10/2022 Van Mill et al.
11,612,102 B2 3/2023 Munch et al.
11,659,788 B2 * 5/2023 Puryk .................. A01D 41/127 414/467
11,825,765 B2 11/2023 Van Mill et al.
2004/0067125 A1 * 4/2004 Dillon ................ A01D 41/1208 198/317
2005/0035769 A1 2/2005 Otto et al.
2006/0240884 A1 10/2006 Klimmer
2007/0254731 A1 * 11/2007 Schmidt .................. A01F 12/46 460/114
2009/0044505 A1 2/2009 Huster et al.
2010/0070144 A1 * 3/2010 Burke ................ A01D 41/1217 414/800
2010/0254792 A1 10/2010 Kinzenbaw
2010/0274452 A1 * 10/2010 Ringwald ............ A01B 69/008 701/50
2010/0314221 A1 12/2010 Garberson et al.
2010/0332051 A1 12/2010 Kormann
2011/0164952 A1 7/2011 Hollenberg
2012/0085458 A1 4/2012 Wenzel
2013/0045067 A1 2/2013 Pickett et al.
2014/0020287 A1 1/2014 Deppermann et al.
2015/0023767 A1 1/2015 Affleck
2015/0032252 A1 1/2015 Galluzzo et al.
2015/0377689 A1 12/2015 Johnson et al.
2017/0055446 A1 3/2017 Nykamp et al.
2017/0150679 A1 6/2017 Van Mill et al.
2017/0368691 A1 12/2017 Li
2018/0160624 A1 6/2018 Ducroquet
2018/0317386 A1 11/2018 Van Mill et al.
2019/0056258 A1 2/2019 Gelada Camps et al.
2019/0141899 A1 5/2019 Winsnes et al.
2019/0200510 A1 7/2019 Chrysanthakopoulos et al.
2019/0322461 A1 10/2019 Banthia et al.
2019/0325534 A1 10/2019 Perry et al.
2019/0364734 A1 12/2019 Kriebel et al.
2020/0045887 A1 2/2020 Bump et al.
2020/0137957 A1 5/2020 Friesen
2020/0367436 A1 11/2020 Schlimgen
2021/0235623 A1 8/2021 Schlimgen
2021/0294337 A1 9/2021 Van Mill et al.
2022/0019240 A1 1/2022 Christiansen et al.
2023/0315105 A1 10/2023 Van Mill et al.
2024/0122105 A1 4/2024 Van Mill et al.

OTHER PUBLICATIONS

Carnegie Mellon University, National Robotics Engineering Center, Active Fill Control, https://www.nrec.ri.cmu.edu/solutions/agriculture/other-agriculture-proje . . . , Apr. 21, 2020, 2 pages.
J&M Manufacturing Co, Inc. Grain Cart Operator's Manual, Model X1222 Series, Rev. 4.20.2020, 49 pages.
U.S. Patent and Trademark Office, International Search Report and Written Opinion in corresponding PCT Application No. PCT/US2021/045768, Nov. 26, 2021.
U.S. Patent and Trademark Office, International Preliminary Report on Patentability in corresponding PCT Application No. PCT/US2021/045768, Dec. 7, 2022.
U.S. Patent and Trademark Office, International Preliminary Report on Patentability in corresponding PCT Application No. PCT/US2021/045768, Feb. 23, 2023.
U.S. Patent and Trademark Office, International Search Report and Written Opinion in corresponding PCT Application No. PCT/US2023/012206, May 16, 2023, 10 pages.
U.S. Patent and Trademark Office, International Preliminary Report on Patentability in related PCT Application No. PCT/US2023/012206, Apr. 10, 2024, 28 pages.
Canadian Intellectual Property Office, First Office Action issued in related Canadian Patent Application 3172448, Dec. 7, 2023, 6 pages.
Canadian Intellectual Property Office, First Office Action issued in related Canadian Patent Application 3191316, Oct. 10, 2024, 12 pages.
Canadian Intellectual Property Office, Second Office Action issued in related Canadian Patent Application 3172448, Feb. 21, 2025, 5 pages.

* cited by examiner

AUTOMATED GRAIN UNLOADING SYSTEM AND RELATED METHODS

CROSS REFERENCE TO RELATED APPLICATIONS

This application is a continuation of PCT Patent Application No. PCT/US2023/012206 filed on Feb. 2, 2023 (pending), which claims the priority of U.S. Provisional Patent Application Ser. No. 63/306,816 filed on Feb. 4, 2022, the disclosures of which are incorporated herein by reference in their entirety.

This application is also generally related to U.S. Provisional Patent Application Ser. No. 63/065,352 filed on Aug. 13, 2020, U.S. Provisional Patent Application Ser. No. 63/091,024 filed on Oct. 13, 2020, PCT Patent Application Serial No. PCT/US2021/045768 filed on Aug. 12, 2021 (expired), U.S. patent application Ser. No. 17/495,981 filed on Oct. 7, 2021 (pending), and U.S. patent application Ser. No. 18/107,147 filed on Feb. 8, 2023 (pending), the disclosures of which are incorporated herein by reference in their entirety.

TECHNICAL FIELD

The present disclosure generally relates to devices for agricultural harvesting equipment and, more particularly, to automated systems for transferring harvested grain, and related methods.

BACKGROUND

Harvesting operations for some agricultural materials, such as grains, may involve transferring harvested grain into containers for transport. For example, a combine harvester may separate the grain from the other portions of the plant and may discharge the harvested grain into a container for transport. In some circumstances, the combine may discharge the harvested grain directly into a gravity wagon or a grain hopper trailer of a tractor-trailer for transport via roads. In other circumstances, the combine may discharge the harvested grain into a grain cart, which may be used to transport the grain across the field, such as to a road, where the grain cart is unloaded into a gravity wagon or a grain hopper trailer of a tractor-trailer for transport via roads.

The present disclosure contemplates that each grain transfer operation involves the potential for spilling grain, such as by overflowing the receiving container or misaligning the discharge stream of the unloading equipment relative to the receiving container. Particularly when grain transfer equipment is operated at a high transfer rate, even a very brief overflow or misalignment may be significantly costly as a large amount of grain may be spilled in a short period of time.

Transferring grain may at times be a skilled labor operation. An operator may be required to monitor and direct the rapid transfer of grain while avoiding spillage, for example. In other instances, an operator may need to move a grain cart filled with grain across a field from a combine harvester to a gravity wagon or a grain hopper trailer of a tractor-trailer at the edge of the field or on a road. Skilled labor savings may be achieved through automation improvements of various aspects or functions of the grain transfer process.

Transporting grain in containers that are not filled to capacity may reduce the time efficiency and/or the cost efficiency of the harvesting and/or transport processes. Similarly, for some agricultural materials, a maximum weight capacity of a transport container may be reached before the transport container is volumetrically full, particularly when the density of the agricultural material varies with moisture content and/or quality.

Accordingly, and in spite of the various advances already made in this field, there is a need to address these, and other issues related to systems and methods for transferring harvested grain into transport containers.

SUMMARY

Generally, an automated grain unloading system for a supplying container with a grain transfer element configured to transfer grain from the supplying container to a receiving container is described. The grain unloading system includes a first sensor configured to detect at least a portion of the receiving container, a second sensor configured to detect an orientation of the grain transfer element, and a processor. The processor is configured to compare the detected portion of the receiving container and the orientation of the grain transfer element. The processor controls the operation of the grain transfer element to direct a transfer of grain from the supplying container to the receiving container based at least in part on a result of the comparison of the detected portion of the receiving container and the orientation of the grain transfer element.

In some embodiments, the first sensor may be configured to detect at least a portion of an upper surface of a grain mound in the receiving container. The processor may be configured to compare the detected portion of the receiving container and the detected portion of the upper surface, and the controlled operation of the grain transfer element may be based at least in part on a result of the comparison of the detected portion of the receiving container and the detected portion of the upper surface.

In alternative embodiments, the first sensor may be configured to detect at least a portion of an upper surface of a grain mound in the receiving container. The processor may be configured to compare the orientation of the grain transfer element and the detected portion of the upper surface, and the controlled operation of the grain transfer element may be based at least in part on a result of the comparison of the orientation of the grain transfer element and the detected portion of the upper surface.

In alternative or additional aspects, the first sensor may be configured to detect an interface of an upper surface of a grain mound in the receiving container and a wall of the receiving container, and an upper edge of the wall. The processor may be configured to determine a freeboard by calculating a vertical distance between the interface and the upper edge of the wall. The processor may be configured to determine a minimum freeboard by calculating a vertical distance between a highest point of the interface and a lowest point of the upper edge of the wall.

In some embodiments, the grain transfer element may include a movable spout configured to direct a stream of discharged grain, and the second sensor may be configured to detect an orientation of the spout. The spout may be movable to direct the stream of discharged grain laterally farther away from the supplying container and/or laterally nearer to the supplying container. The spout may be movable to direct the stream of discharged grain generally forwardly and/or generally rearwardly with respect to the supplying container. The spout may be movable to direct the stream of discharged grain generally side-to-side with respect to the grain transfer element. The processor may be configured to control the orientation of the spout to direct the stream of discharged grain. The processor may be configured to prevent a discharge of grain via the grain transfer element if the processor determines that grain discharged from the grain transfer element would not be discharged into the receiving container.

In alternative embodiments, the processor may be configured to provide a perceptible indication to move the supplying container to position the grain transfer element relative to the receiving container. The processor may be configured to evaluate the position of the grain transfer element relative to the receiving container, and the processor may provide a perceptible indication to move the supplying container to position the grain transfer element relative to the receiving container based at least in part on the position of the grain transfer element relative to the receiving container. The first sensor may be configured to detect at least a portion of an upper surface of a grain mound in the receiving container, and the processor may be configured to evaluate the position of the grain transfer element relative to the detected portion of the upper surface. The processor may provide a perceptible indication to move the supplying container to position the grain transfer element relative to the receiving container based at least in part on the position of the grain transfer element relative to the detected portion of the upper surface.

In alternative or additional aspects, at least one of the supplying container and/or the receiving container may include a scale element configured to detect a weight of the grain in at least one of the supplying container and/or the receiving container. The processor may be configured to direct the transfer of grain based at least in part on the weight of the grain in at least one of the supplying container and/or the receiving container.

In some embodiments, the grain transfer element may include a grain transfer control element configured to adjust a rate of grain transfer via the grain transfer element, and the processor may be configured to adjust the rate of transfer of grain via the grain transfer control element. The grain transfer control element may include a movable gate operatively interposing the supplying container and the grain transfer element, and the processor may be configured to direct positioning of the movable gate.

In alternative or additional aspects, the system may include a data storage device operatively connected to the processor. The system may include a user interface device operatively connected to the processor. The user interface device may be at least one of a smart phone and/or a tablet computer.

In some embodiments, the supplying container may be a grain cart grain tank and the system may be included on the grain cart.

A method of operating an automated grain unloading system includes operating a first sensor to detect at least a portion of a receiving container, operating a second sensor to detect an orientation of a grain transfer element, and transferring grain from a supplying container to the receiving container based at least in part on a comparison of the detected portion of the receiving container and the detected orientation of the grain transfer element.

In alternative embodiments, the method may include operating the first sensor to detect at least a portion of an upper surface of a grain mound in the receiving container, and transferring grain from the supplying container to the receiving container based at least in part on a comparison of the detected portion of the receiving container and the detected portion of the upper surface. The method may include operating the first sensor to detect an upper surface of a grain mound in the receiving container, and transferring grain from the supplying container to the receiving container based at least in part on a comparison of the detected orientation of the grain transfer element and the detected portion of the upper surface.

In some embodiments, the method may include detecting an interface between an upper surface of a grain mound in the receiving container and a wall of the receiving container, detecting at least a portion of an upper edge of the wall, and determining a freeboard by calculating a vertical distance between the interface and the detected portion of the upper edge of the wall. The method may include calculating a minimum freeboard by calculating a vertical distance between a highest point of the interface and a lowest point of the detected portion of the upper edge of the wall. The method may include slowing down and/or stopping transferring grain upon determining that the freeboard is less than a predetermined freeboard minimum limit. In alternative embodiments, the method may include preventing a discharge of grain if the grain would not be discharged into the receiving container. The method may include receiving a maximum unload weight limit, detecting a weight of grain unloaded, and stopping transferring grain upon determining that the weight of grain unloaded has reached the maximum unload weight limit. The method may include providing a perceptible indication to move the supplying container to position the grain transfer element relative to the receiving container.

In alternative embodiments, the grain transfer element may include a movable spout, and the method may include moving the spout to direct the stream of discharged grain laterally farther away from the supplying container and/or laterally nearer to the supplying container. The method may include moving the spout to direct the stream of discharged grain generally forwardly and/or generally rearwardly with respect to the supplying container. The method may include moving the spout to direct the stream of discharged grain generally side-to-side with respect to the grain transfer element.

Additional aspects and advantages of the invention will become more apparent upon further review of the detailed description of the illustrative embodiments taken in conjunction with the accompanying drawings.

DETAILED DESCRIPTION

Illustrative embodiments according to at least some aspects of the present disclosure are described and illustrated below and include devices and methods relating to transferring harvested agricultural materials, such as grain, into transport containers. It will be apparent to those of ordinary skill in the art that the embodiments discussed below are examples and may be reconfigured without departing from the scope and spirit of the present disclosure. It is also to be understood that variations of the exemplary embodiments contemplated by one of ordinary skill in the art shall concurrently comprise part of the instant disclosure. The illustrative embodiments as discussed below may include optional steps, methods, and features that one of ordinary skill should recognize as not being a requisite to fall within the scope of the present disclosure.

The present disclosure includes, among other things, automated systems for transferring harvested grain into transport containers, and related methods. Some illustrative embodiments according to at least some aspects of the present disclosure are described below in the context of a grain cart and operations involving transferring grain from the grain cart to another container. It will be appreciated, however, that similar systems and method may be utilized in connection with other agricultural equipment and containers. As used herein, “transport container” may refer to any device configured to hold harvested grain during movement from one location to another location. Exemplary transport containers may include various types of agricultural equipment, such as grain carts, gravity wagons, grain hopper trailers for tractor-trailers, and the like. Transport containers may also include railcars configured to haul grain, barge or ship holds configured to haul grain, and the like. As used herein, “supplying container” may refer to a container from which grain is transferred and “receiving container” may refer to a container into which grain is transferred.

Figure 1:
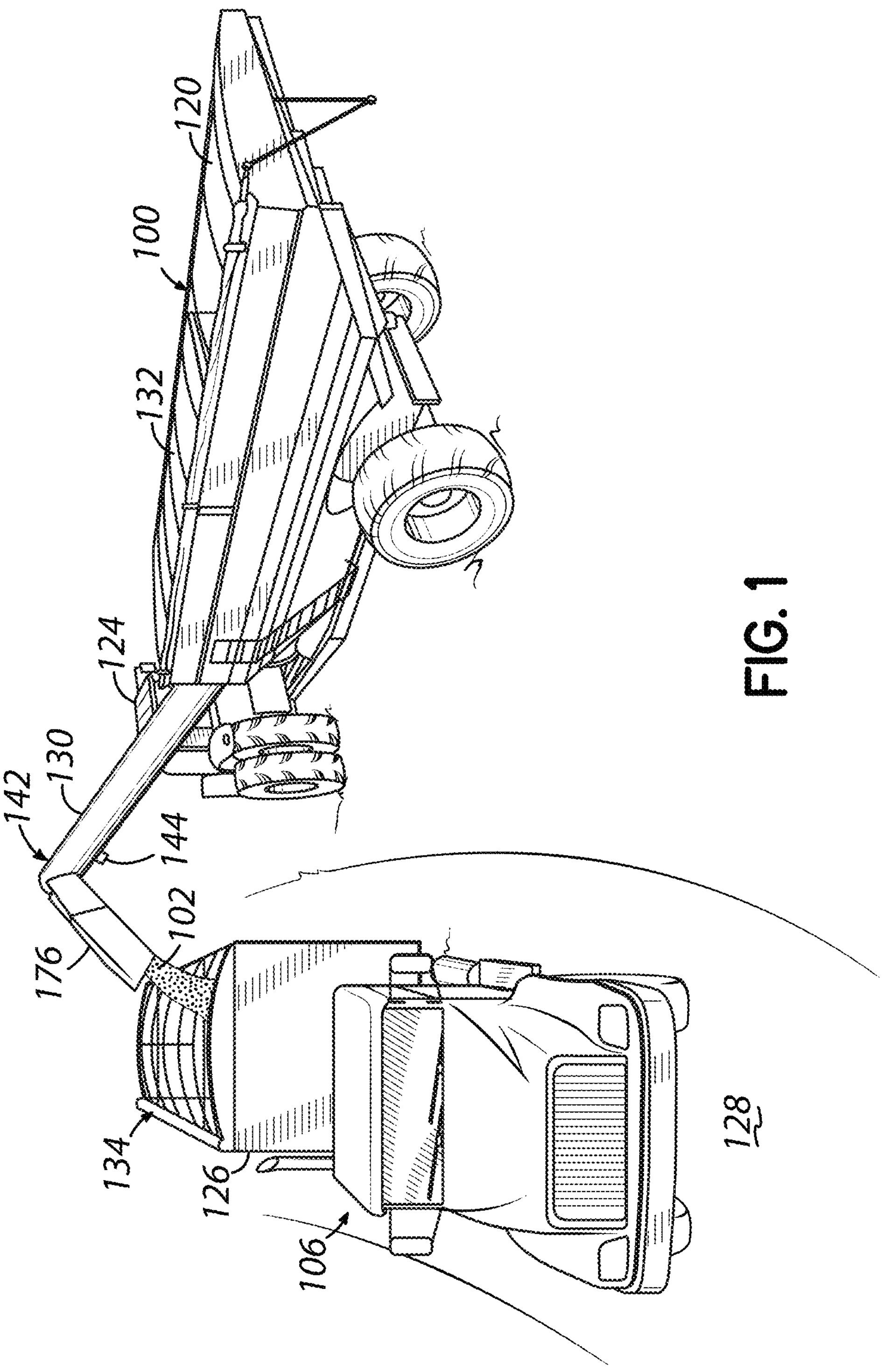
FIG. 1 is a perspective view of an illustrative grain cart transferring harvested grain into a grain hopper trailer of a tractor-trailer.
Figure 2:
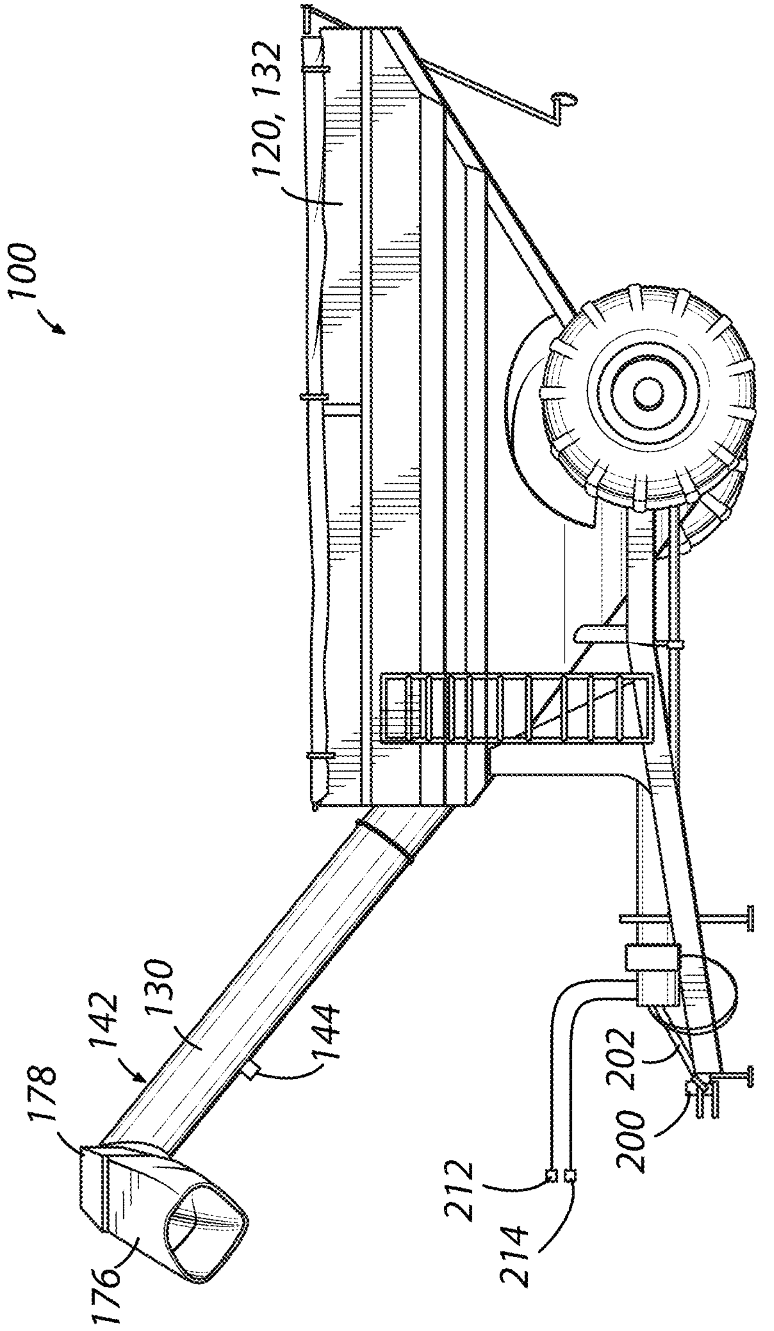
FIG. 2 is a side elevation view of the illustrative grain cart of FIG. 1.
Figure 3:
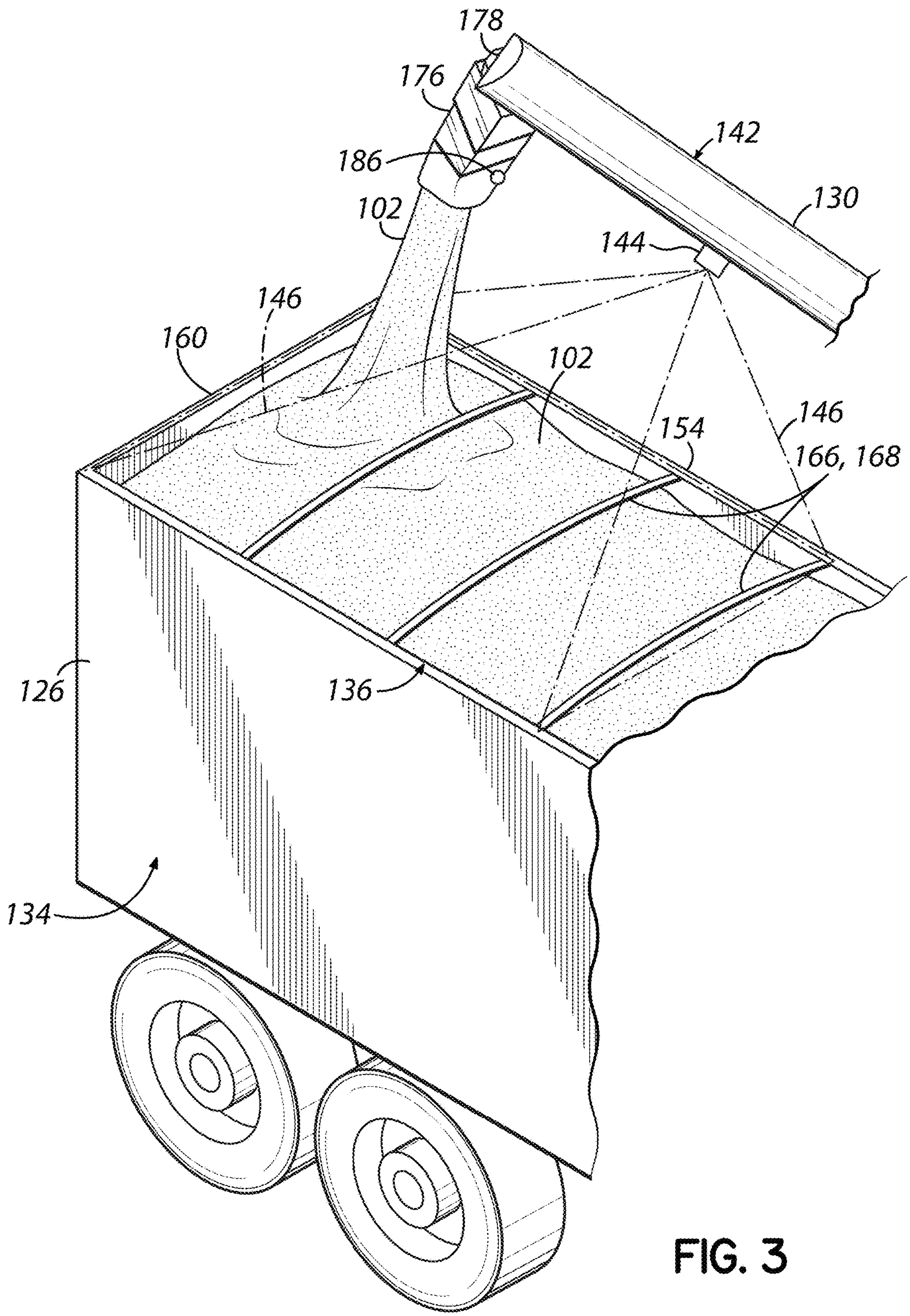
FIG. 3 is a perspective view of the illustrative grain cart of FIGS. 1 and 2 transferring harvested grain into a grain hopper trailer of a tractor-trailer.

FIG. 1 is a perspective view of an illustrative grain cart 100 transferring harvested grain 102 to a grain hopper trailer 126 of a tractor-trailer 106. FIG. 2 is a side elevation view of the grain cart 100 and FIG. 3 is a perspective view of the grain cart 100, all according to at least some aspects of the present disclosure. The grain cart 100 includes a grain tank 120 (a supplying container 132) and a grain transfer element 142. The grain transfer element 142 includes an unloading conveyor 130, such as an auger conveyor, and a movable spout 176 located at the discharge end of the unloading conveyor 130. The grain transfer element 142 is configured to transfer the grain 102 from the grain cart grain tank 120 to a receiving container 134, such as the grain hopper trailer 126 of a tractor-trailer 106 as shown in FIG. 1. The tractor-trailer 106 may then transport the harvested grain 102 via the road 128, for example.

Figure 4:
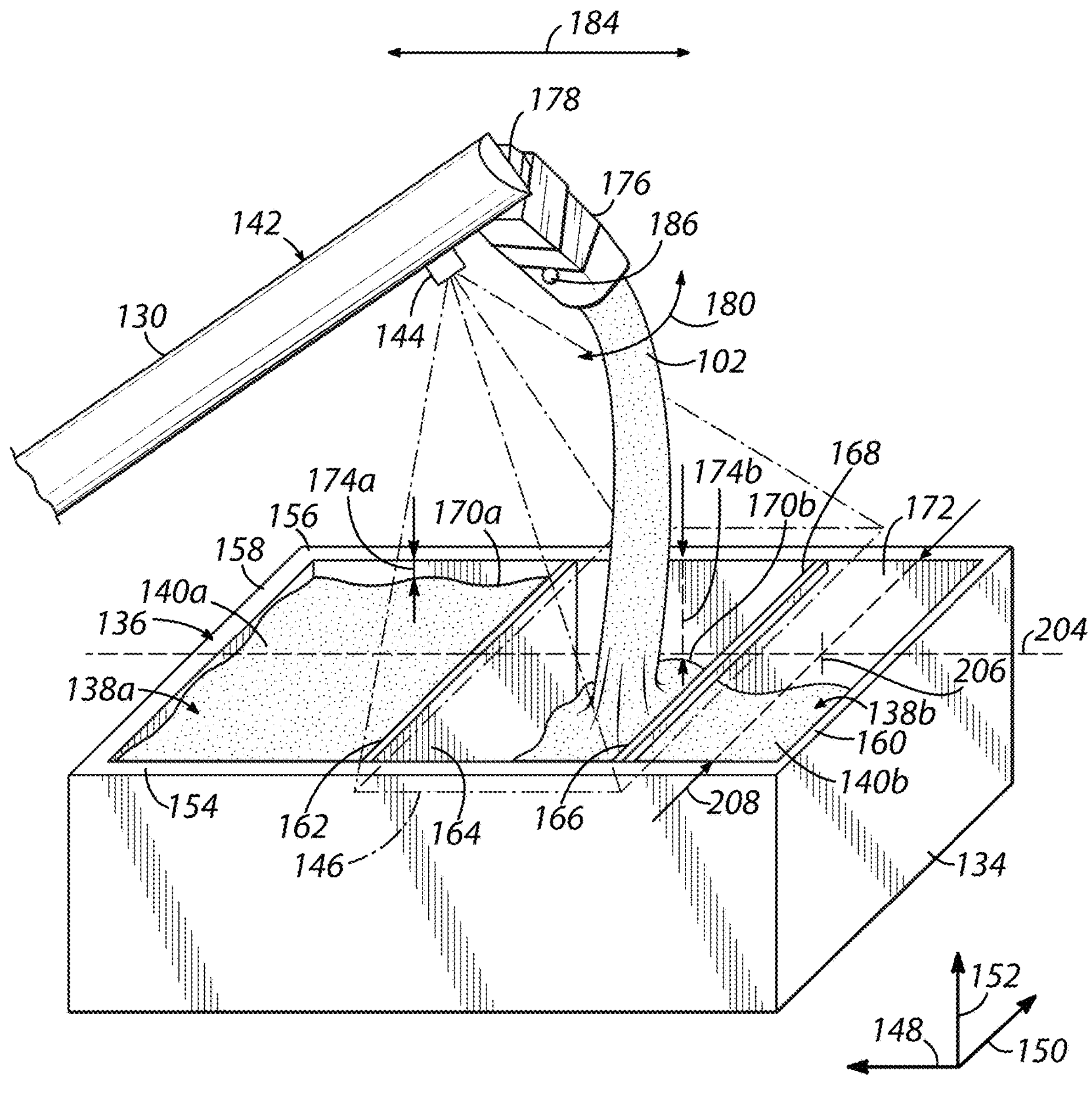
FIG. 4 is a partial isometric view of the illustrative grain cart of FIGS. 1 through 3 transferring grain into a receiving container.
Figure 5:
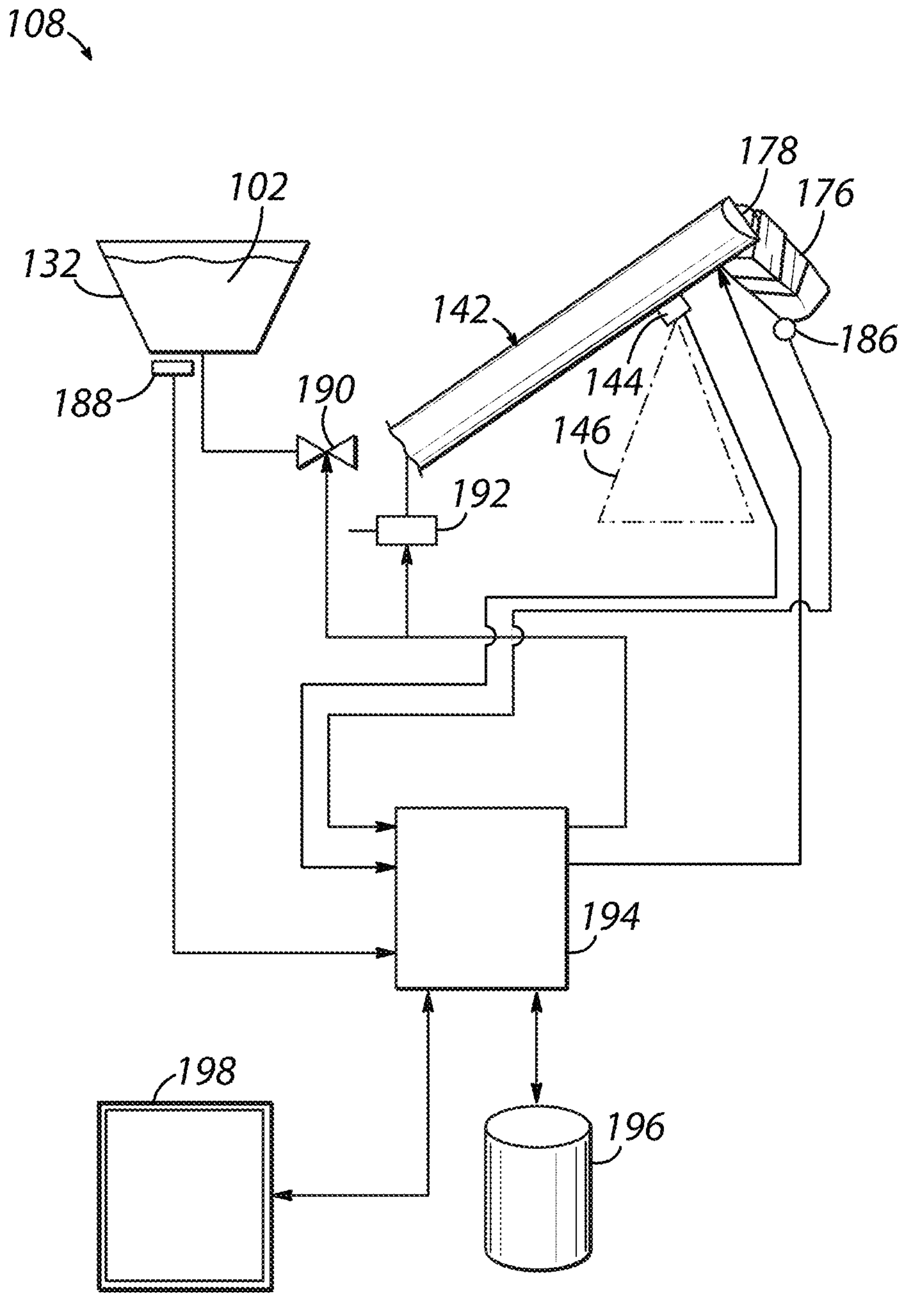
FIG. 5 is a simplified block diagram of an exemplary automated grain filling system.
Figure 6:
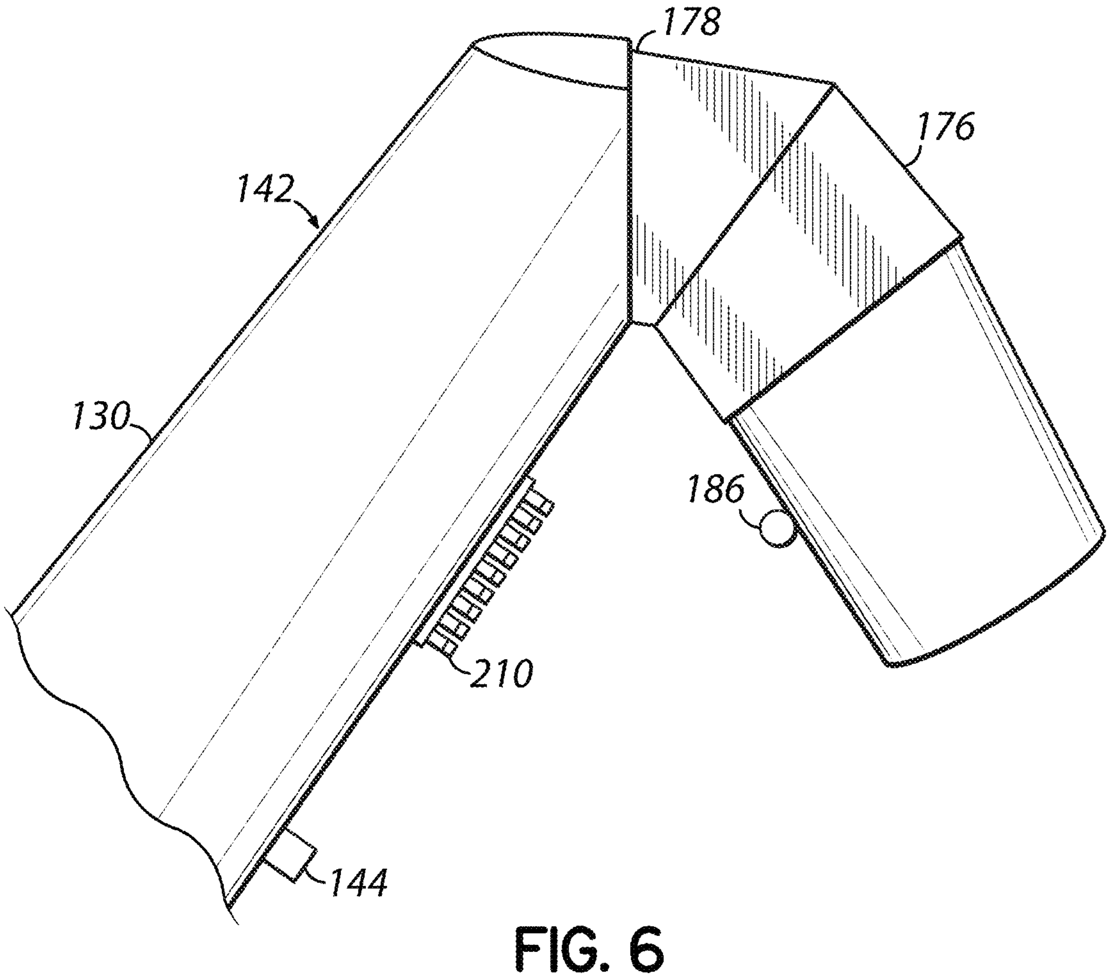
FIG. 6 is a perspective view of the discharge end of an unloading conveyor with a movable spout and human readable indicator.

FIG. 4 is a partial isometric view of the illustrative grain cart 100 transferring grain 102 into a receiving container 134. FIG. 5 is a simplified block diagram of an exemplary automated grain unloading system 108. FIG. 6 is a perspective view of the discharge end of the unloading conveyor 130 with a movable spout 176 and human readable indicator 210.

Referring to FIGS. 1 and 5, the grain cart 100 includes an automated grain unloading system 108. The system 108 is configured to operate in connection with transferring grain 102 from a supplying container 132 (e.g., the grain cart grain tank 120) to a receiving container 134 (e.g., the grain hopper trailer 126). Generally, the system 108 is configured to facilitate the transfer of the grain 102 from a supplying container 132 to a receiving container 134 while reducing the likelihood of spilling grain 102 and/or facilitating increased transfer speed and/or efficiency, for example.

Referring to FIGS. 4 and 5, the illustrative system 108 is configured to detect at least a portion of the receiving container 134. The system 108 is also configured to detect an orientation of the grain transfer element 142, including the unloading conveyor 130 and/or movable spout 176. In this illustrative embodiment, the system 108 compares the detected portion of the receiving container 134 and the orientation of the grain transfer element 142, including the unloading conveyor 130 and/or movable spout 176. The system 108 directs the operation of the grain transfer element 142 (e.g., the unloading conveyor 130 and/or movable spout 176) based at least in part on the result of the comparison of the detected portion of the receiving container 134 and the orientation of the grain transfer element 142. In this illustrative embodiment, the system 108 is also configured to detect at least a portion of the upper surfaces 138*a*, 138*b* of the grain mounds 140*a*, 140*b* in the receiving container 134. The system 108 compares the orientation of the grain transfer element 142, including the unloading conveyor 130 and/or movable spout 176, and the detected portion of the upper surfaces 138*a*, 138*b*. Based at least in part on the result of the comparison of the orientation of the grain transfer element 142 and the detected portion of the upper surfaces 138*a*, 138*b*, the system 108 directs the operation of the grain transfer element 142 (e.g., the unloading conveyor 130 and/or movable spout 176). In this illustrative embodiment, the system 108 is also configured to compare the detected portion of the receiving container 134 and the detected portion of the upper surfaces 138*a*, 138*b*. The system 108 directs the operation of a grain transfer element 142 (e.g., the unloading conveyor 130 and/or movable spout 176) based at least in part on the result of the comparison of the detected portion of the receiving container 134 and the detected portion of the upper surfaces 138*a*, 138*b*. For example, the system 108 may start, stop, and/or adjust the speed of the transfer of grain 102 via the grain transfer element 142. Additionally, the system 108 may adjust the position of grain transfer element 142 and/or movable spout 176 to direct the grain 102 into the receiving container 134, as desired. Other automated component movements and/or grain transfer may be used as well, or in the alternative. The system 108 may adjust the position of grain transfer element 142 and/or movable spout 176 to direct the grain 102 into portions of the receiving container 134 where there is less grain 102 to distribute the grain 102 more evenly in the receiving container 134, for example.

The spout 176 may be articulatable in at least one direction by a spout articulation mechanism 178. For example, the spout 176 may be movable generally as indicated by arrow 180 so as to direct the discharge stream of grain 102 generally laterally farther away from the grain cart 100 and/or generally laterally nearer to the grain cart 100. That is, in the case of a grain cart positioned generally parallel alongside the receiving container 134, the grain 102 may be discharged generally toward the far wall 172 and/or generally toward the near wall 182 of the receiving container 134. In some embodiments, the spout 176 may be movable generally as indicated by arrow 184 so as to direct the discharged grain 102 generally left and/or right. That is, in the case of a grain cart positioned generally parallel alongside the receiving container 134, the grain 102 may be discharged generally toward a longitudinally forward end and/or toward a longitudinally rear end of the receiving container 134. As an alternative description of the direction indicated by arrow 184, the spout 176 may be movable to discharge grain 102 generally forwardly and/or rearwardly relative to the grain cart 100. In this exemplary embodiment, the system 108 includes a spout position sensor 186, configured to detect the position of the spout 176. The spout position sensor 186 sends a signal indicating the position and/or orientation of the spout 176. In some embodiments, the spout position sensor 186 may monitor the movement of the spout articulation mechanism 178. In alternative embodiments, the spout position sensor 186 may monitor the movement of one or more components of the spout articulation mechanism 178. For example, a multi-axis tilt sensor may be used and/or sensors otherwise associated with mechanisms used to move the spout 176. In some embodiments, the spout position sensor 186 may monitor the movement of all or part of the grain transfer element 142.

Referring again to FIGS. 4 and 5, automated grain unloading systems according to at least some aspects of the present disclosure may include one or more sensors that are configured to detect various parameters associated with transferring grain 102 from a supplying container 132 to a receiving container 134. For example, the illustrative system 108 includes a sensor 144 configured to detect at least a portion of the upper perimeter 136 of the receiving container 134 and/or at least a portion of the upper surfaces 138*a*, 138*b* of the grain mounds 140*a*, 140*b* in the receiving container 134. In some embodiments, separate receiving container upper perimeter and grain mound sensors may be utilized. Similarly, multiple sensors having different fields of view (overlapping or not overlapping) may be utilized.

In the illustrative system 108, the sensor 144 is configured to detect both at least a portion of the upper perimeter 136 of the receiving container 134 and at least a portion of the upper surfaces 138*a*, 138*b* of the grain mounds 140*a*, 140*b* in the receiving container 134. In this illustrative system 108, the sensor 144 is a LIDAR ("light detection and ranging" and/or "laser imaging, detection, and ranging") scanner which includes a laser configured to scan the desired field of view 146. In alternative embodiments, the sensor 144 may be, for example, one or more stereoscopic cameras, proximity sensors, time-of-flight sensors, time-of-flight cameras, and/or global navigation satellite system (e.g., global positioning system (GPS)) receivers, and/or any other suitable sensor.

In some embodiments that include laser-based sensors, the sensor 144 may be configured to generate a point cloud of the field of view 146. The system 108 may be configured to detect and/or identify features of interest within the field of view 146, such as by assessing point density and/or performing analysis, such as a least squares fit. For example, the system 108 may be configured to identify at least a portion of the upper perimeter 136 of the receiving container 134 and at least a portion of the upper surfaces 138*a*, 138*b* of the grain mounds 140*a*, 140*b* in the receiving container 134.

In this illustrative embodiment, the sensor 144 is disposed on the grain transfer element 142 of the grain cart 100. The sensor 144 points generally outward and downward from the grain transfer element 142, thus having a field of view 146 including at least a portion of the receiving container 134 and the grain mounds 140*a* 140*b*. More specifically, the field of view 146 includes the portion of the receiving container 134 within an area into which the grain transfer element 142 is configured to discharge the grain 102. Depending on the extent of the field of view 146, only a portion of the entire upper perimeter 136 of the receiving container 134 may be detectable by the sensor 144 at any particular time. In some embodiments, the sensor 144 may be configured with a broader field of view 146, such as to detect portions of the receiving container 134 substantially beyond the area into which the grain transfer element 142 is arranged to discharge the grain 102.

Referring again to FIGS. 4 and 5, the illustrative system 108 may be configured to detect various aspects of the receiving container 134 and/or the grain mounds 140*a*, 140*b* in the receiving container 134. For clarity, the following description mentions various features of an exemplary receiving container 134 with reference to a longitudinal (e.g., front-back) direction 148, a lateral (e.g., side to side) direction 150, and a vertical (up and down) direction 152, which generally describe typical receiving containers 134 configured for transporting grain 102, such as the grain hopper trailer 126 of the tractor-trailer 106. Additionally, for clarity, the following description utilizes the point of view of a grain cart 100 which is positioned generally laterally alongside the receiving container 134. Thus, from the point of view of the grain cart 100, a feature at the forward end or rear end of the receiving container 134 may be described as left or right. Similarly, from the point of view of the grain cart 100, a feature on a lateral side of the receiving container 134 may be described as near or far.

This illustrative system 108 is configured to detect and/or distinguish at least a portion of the upper perimeter of the receiving container 134. This may be accomplished by detecting and/or distinguishing one or more of the upper perimeter edges that define the upper opening of the container 134. These upper perimeter edges (of an exemplary square or rectangular container) may be edges 154, 156, 158, 160. Such detection may not be of the edge or edges themselves but of other receivers or detectable components fixed at the desired location or locations.

This illustrative system 108 is configured to detect and/or distinguish laterally extending upper perimeter edges that are not the left-most upper perimeter edge 158 or the right-most upper perimeter edge 160 of the receiving container 134. For example, the system 108 is configured to detect and/or distinguish an intermediate upper perimeter edge 162 of a lateral partition 164 (which separates the grain mounds 140*a*, 140*b*) and/or an intermediate upper perimeter edge 166 of a lateral cross member 168 (e.g., a lateral brace or a tarp bow).

Referring again to FIGS. 4 and 5, the system 108 may be configured to determine that a particular detected laterally extending upper perimeter edge is the left upper perimeter edge 158 by determining that the longitudinally extending upper perimeter edges 154, 156 extend to, but not substantially longitudinally beyond, the left upper perimeter edge 158 or the right upper perimeter edge 160. That is, the near and far upper perimeter edges 154, 156 extend to, but not substantially left or right, beyond the left upper perimeter edge 158 or the right upper perimeter edge 160, respectively. Similarly, a laterally extending upper perimeter edge, such as intermediate upper perimeter edge 162 or intermediate upper perimeter edge 166 may be identified as an intermediate laterally extending upper perimeter edge because the near and far upper perimeter edges 154, 156 extend substantially longitudinally (e.g., left and right from the perspective of the grain cart 100) beyond the intermediate laterally extending upper perimeter edge. Generally, the illustrative system 108 may be configured to ignore intermediate laterally extending upper perimeter edges. Alternatively, some embodiments may be configured to identify laterally extending partitions and/or may be configured to treat separate portions of the receiving container 134 defined by a partition as separate receiving containers 134.

In some embodiments, one or more sensors may be configured to detect the grain mounds 140*a*, 140*b* in the receiving container 134. For example, one or more sensors may be configured to obtain sufficient data for the system 108 to generate a three-dimensional map of at least a portion of the upper surfaces 138*a*, 138*b* of the grain mounds 140*a*, 140*b*. Some systems may be configured to develop a three-dimensional map of substantially all of the upper surfaces 138*a*, 138*b* of the grain mounds 140*a*, 140*b*.

The illustrative system 108 is configured to detect the interfaces 170*a*, 170*b* between the grain mounds 140*a*, 140*b* and a far wall 172 of the receiving container 134. The interfaces 170*a*, 170*b* may be a generally continuous, curved or straight line on the respective wall (e.g., far wall 172) of the receiving container 134. The system 108 is configured to determine the freeboard 174*a*, 174*b*, which is used herein to refer to the vertical distance between the highest point of the interface 170*a*, 170*b* and the lowest point on the corresponding upper perimeter edge 156. Although this illustrative system 108 is configured to determine the freeboard 174*a*, 174*b* on the far wall 172 of the receiving container 134, other embodiments may determine the freeboard on other walls of the receiving container 134 in addition to or instead of on the far wall 172. For example, alternative embodiments may be configured to determine freeboard on opposite walls, on adjacent walls, on three of four walls, and/or on all walls of the receiving container 134.

In some circumstances, it may be advantageous to utilize a system configured to detect one or more interfaces between the grain mounds 140*a*, 140*b* and the receiving container 134 instead of a system configured to develop a three-dimensional map of substantial portions of the upper surfaces 138*a*, 138*b* of the grain mounds 140*a*, 140*b*. For example, focusing on the interfaces rather than large areas of the surfaces 138*a*, 138*b* may require less scanning by the sensor 144 (e.g., LIDAR scanner) and/or less processing. Additionally, substantial dust may be generated as the grain 102 is discharged into the receiving container 134, particularly where the incoming stream of grain 102 meets the upper surfaces 138*a*, 138*b* of the grain mounds 140*a*, 140*b*. As a result, in some circumstances, utilizing measurements at the wall of the receiving container (e.g., the mound-wall interface) may reduce scanning disruptions caused by dust.

Referring again to FIGS. 4 and 5, the illustrative system 108 includes a scale element 188 (e.g., load cell or weigh bar) configured to detect the weight of the load in the supplying container 132 (e.g., the grain cart grain tank 120). For example, the scale element 188 may be configured to detect various weights of the grain cart 100, such as an empty weight, a loaded weight, and a current weight. By subtracting the appropriate measured weights, the weight of grain loaded and/or unloaded may be calculated. For example, by subtracting the empty weight from the current weight, an amount of grain 102 in the grain cart 100 may be determined. Then, by setting that current weight as the loaded weight and monitoring an updated current weight, an amount of grain 102 that has been unloaded may be determined. In some embodiments, a scale element may be located on the receiving container 134 and may communicate a weight of the receiving container 134 to the system 108.

Figure 9:
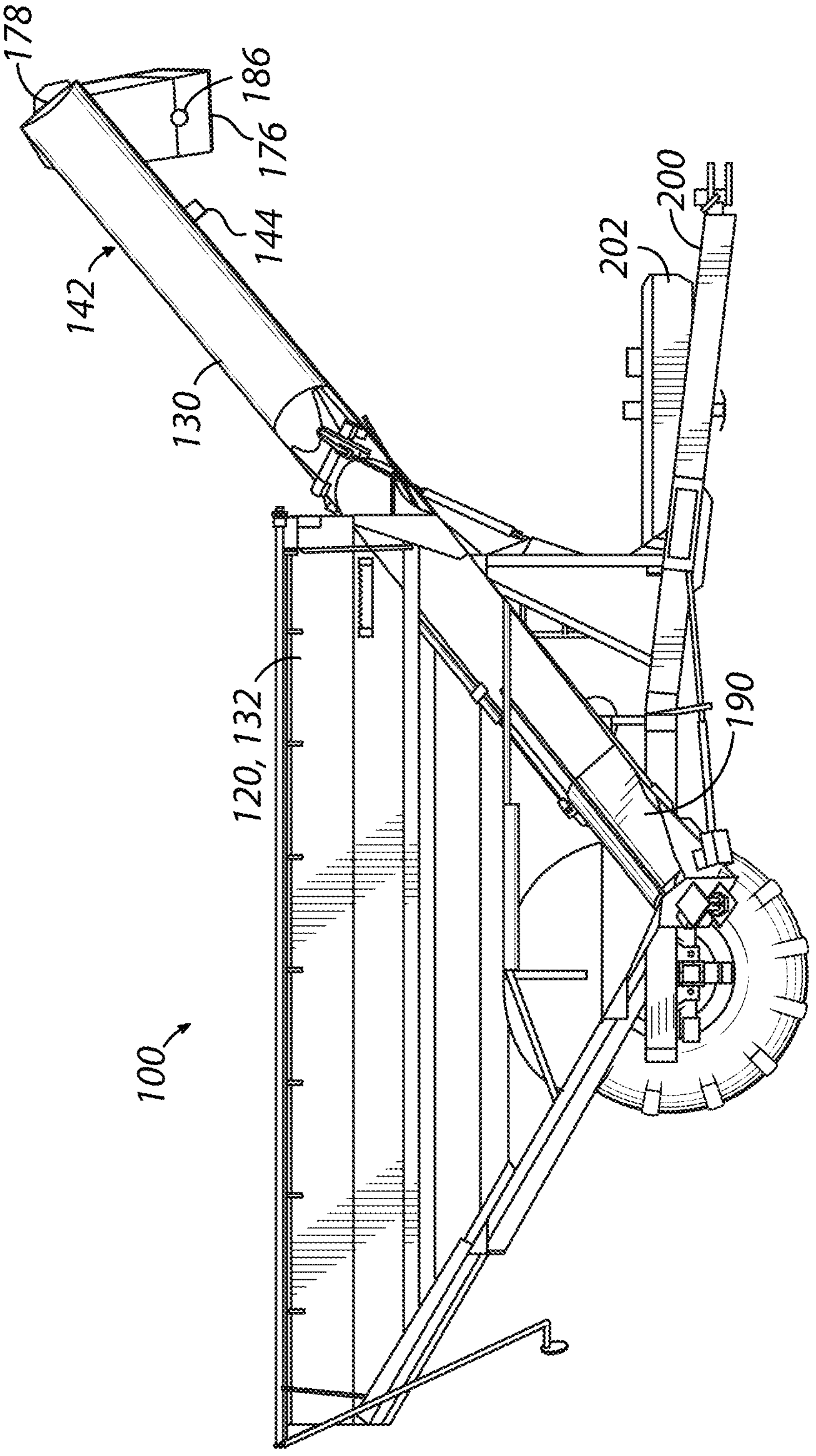
FIG. 9 is a partial sectional view of the illustrative grain cart of FIGS. 1 through 3 with a metering gate in a closed position.
Figure 10:
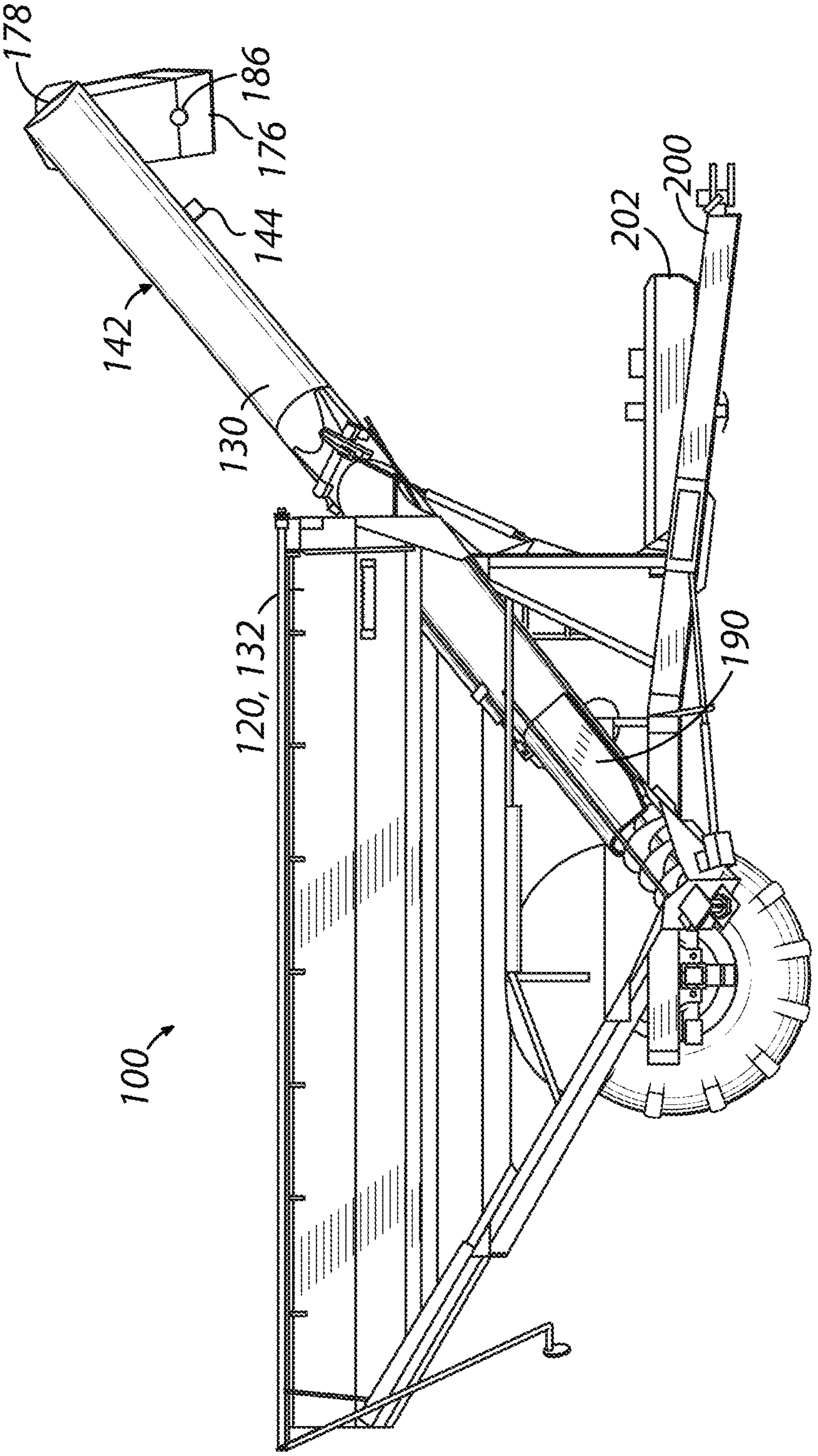
FIG. 10 is a partial sectional view of the illustrative grain cart of FIGS. 1 through 3 with the metering gate in an at least partially open position.

FIG. 9 is a partial sectional view of the illustrative grain cart 100 with a metering gate 190 in a closed position. FIG. 10 is a partial sectional view of the grain cart 100 with the metering gate 190 in an at least partially open position. Referring to FIG. 5, the illustrative system 108 includes one or more grain transfer control elements 190, 192 configured to adjust the rate (including starting and/or stopping) of grain 102 transfer via the grain transfer element 142. For example, the illustrative system 108 may include a movable metering gate 190 operatively interposing the supplying container 132 and the grain transfer element 142 (see FIGS. 9 and 10). Opening the metering gate 190 allows grain 102 to enter the grain transfer element 142 and shutting the metering gate 190 prevents grain 102 from reaching the grain transfer element 142. Positioning the metering gate 190 at an intermediate position between shut and open may allow the grain transfer element 142 to operate at less than its maximum grain transfer rate. The metering gate 190 may be hydraulically operable, for example.

The illustrative system 108 may include a selectively engageable mechanical element 192 in the drive train for the grain transfer element 142. For example, the selectively engageable mechanical element 192 may comprise a clutch, which may be an electric and/or hydraulically operable device and may be configured to selectively mechanically engage and disengage the grain transfer element 142, such as with respect to a power takeoff of a tractor 124 to which the grain cart 100 may be operatively coupled. In other embodiments including a hydraulically driven grain transfer element 142, the selectively engageable mechanical element 192 may comprise a remotely controllable valve configured to selectively operate the hydraulic motor from the source of hydraulic power.

The illustrative system 108 includes one or more processors 194 configured to provide computation, analysis, control, and/or monitoring functions associated with various elements of the system 108, as described herein. The processor 194 may be operatively coupled to one or more data storage devices 196, which may be comprise instructions for the processor 194 (e.g., software or firmware) and/or which may store data associated with operation of the system 108. Generally, unless specifically indicated otherwise, any operation described herein as being performed by the system 108 may be performed by, at the direction of, and/or under the control of the processor 194.

Figure 7:
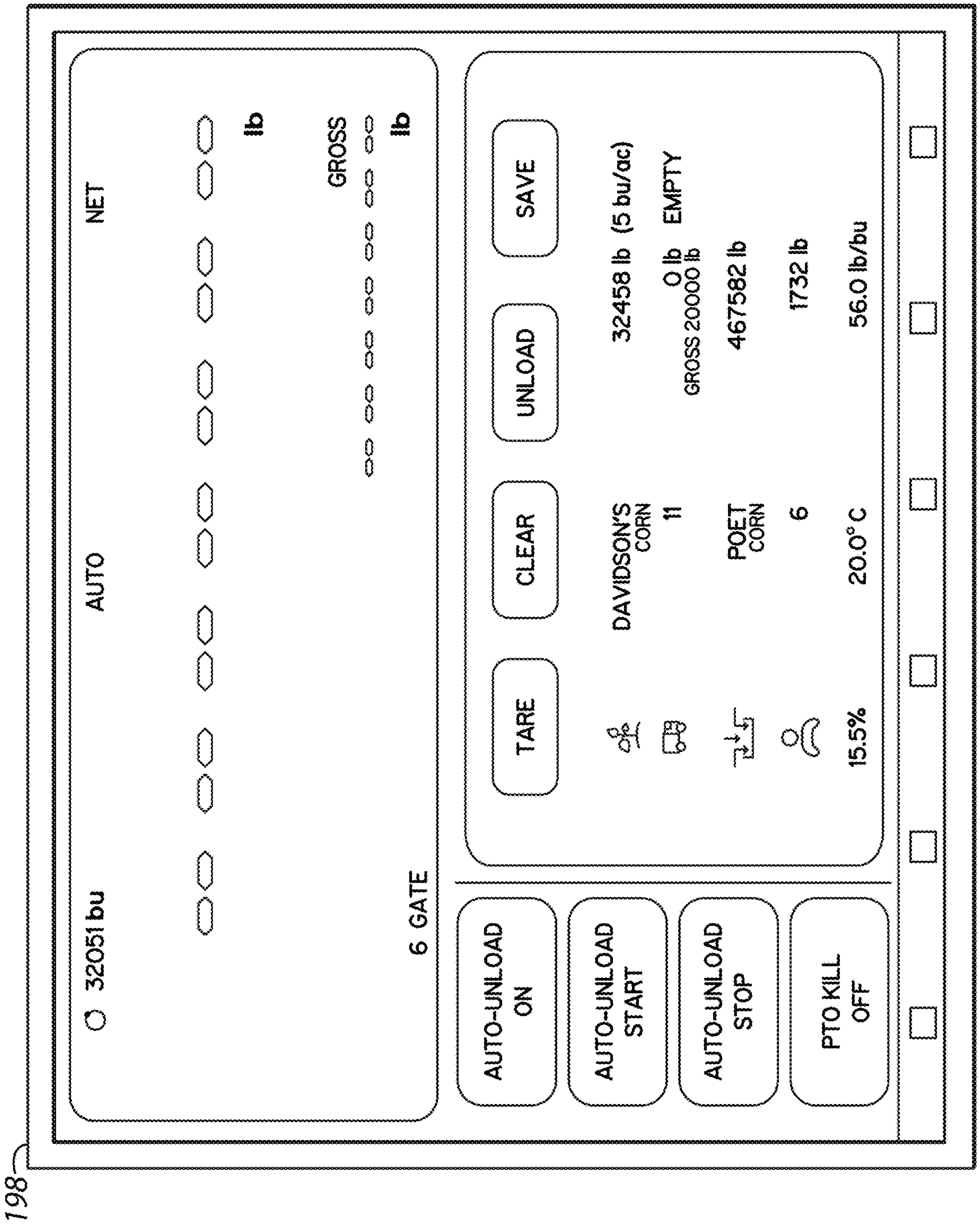
FIGS. 7 and 8 are illustrations of an exemplary graphical user interface.
Figure 8:
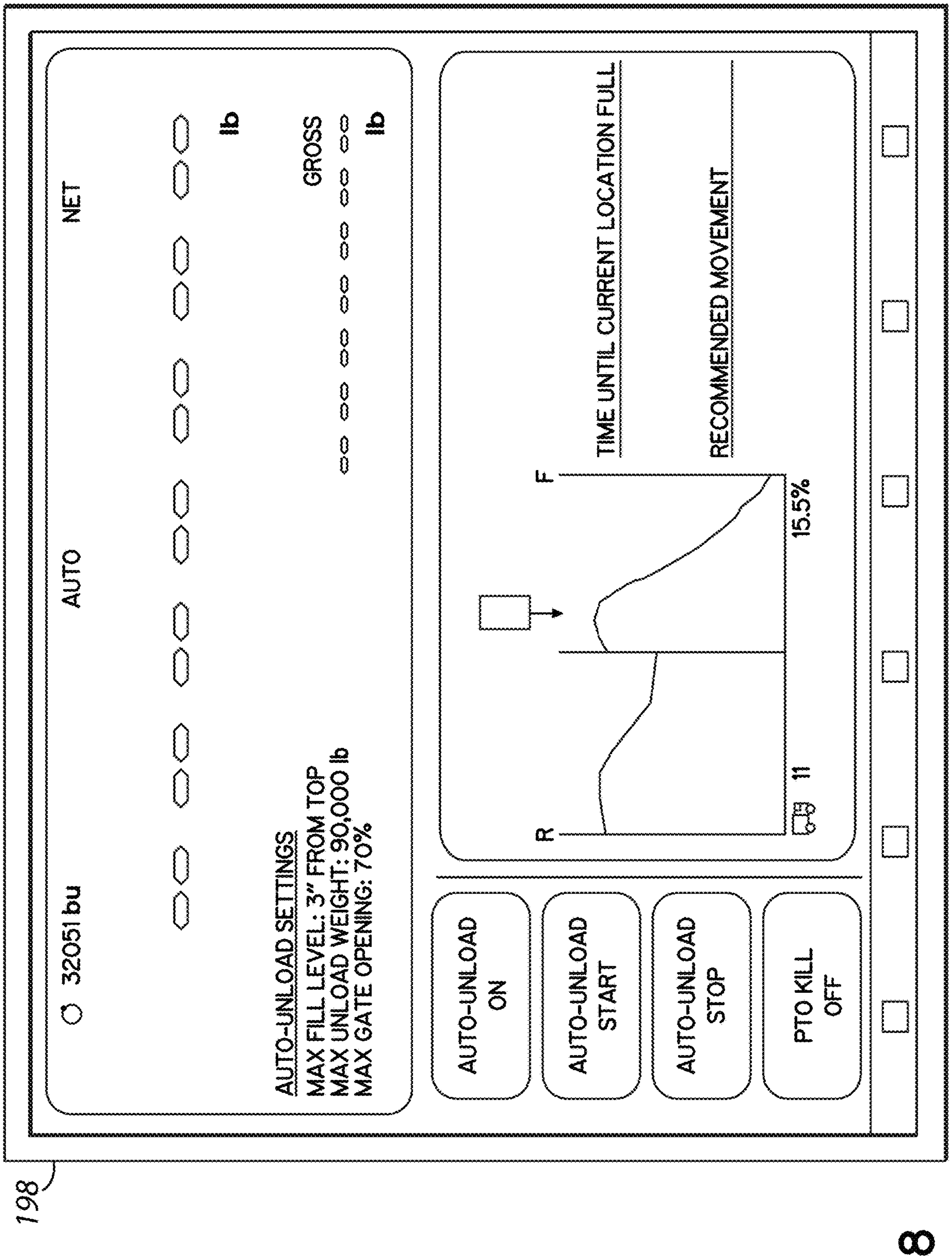

FIGS. 7 and 8 are illustrations of an exemplary graphical user interface. Referring to FIGS. 4, 5, 7, and 8, the illustrative system 108 includes one or more user interface devices 198 operatively connected to the processor 194. For example, the user interface device 198 may comprise a smart phone or tablet computer running an application configured to interface with the processor 194. Alternatively or in addition, a user interface device 198 may comprise a dedicated device, such as a control panel. Various user interface devices 198 may be operatively connected to the processor 194 via wires and/or wirelessly. For example, an operator driving a tractor 124 pulling a grain cart 100 may utilize a user interface device 198 located in the cab of the tractor 124 to operate the system 108 on the grain cart 100. As one of many other alternatives for allowing operator control and interface, some or all of the necessary processing hardware and software may be contained in and/or accessible through one or more hand held devices such as a tablet computer, lap top computer, smart phone and the like. The software may include a mobile phone application, for example, and/or may be stored remotely, such as "in the cloud."

Generally, this illustrative system 108 is configured such that the receiving container 134 does not require special modifications, special markings visible to the sensor 144, etc., for proper operation of the system 108. For example, the illustrative system 108 is generally configured to detect some or all of the upper perimeter 136 of any receiving container 134, regardless of size, shape, color, orientation, etc. Further, this illustrative system 108 is configured such that pre-programming with information about a particular receiving container 134 is not necessary (e.g., container dimensions, capacity, etc.). This illustrative system 108 is generally configured to be substantially self-contained on or in association with the grain cart. For example, the user interface device 198 may be operatively connected to the system 108 on the grain cart 100, even though the user interface device 108 may not be physically located on the grain cart 100. Further, this illustrative system 100 may operate without communication between the system 100 and the receiving container 134. As such, this illustrative system 108 is generally configured to be capable of independent operation and for use with any receiving container 134.

The illustrative system 108 is configured such that unloading is prevented unless the grain 134 is expected to be discharged into the receiving container 134 without substantial spillage. In some embodiments, the system 108 may evaluate the location of the upper perimeter 136 of the receiving container 134 relative to the position and/or orientation of the grain transfer element 142 and/or the spout 176. For example, if the system determines that grain 102 discharged from the spout 176 would not go into the receiving container 134 because there is no receiving container 134 present or because the receiving container 134 is positioned such that the grain 102 will not go into the receiving container 134, the system 108 may not open the metering gate 190 to allow grain 102 to enter the grain transfer element 142. Similarly, the illustrative system 108 includes an auto-shutoff feature configured to shut the metering gate 190 and/or disengage the clutch during unloading if the system 108 determines that the grain 102 will not go into the receiving container 134. For example, if the grain cart 100 or the receiving container 134 pulls away while grain transfer is in progress, the system 108 will shut the metering gate 190 and/or disengage the clutch to prevent or minimize spillage.

Referring to FIGS. 1, 4, and 5, An autonomous drive system may be additionally, or alternatively, provided for the transport container or supplying container, such as the grain cart 100. Specifically, the grain cart 100 may incorporate an autonomous drive system and the system 108 would signal to the autonomous drive control of the grain cart 100 to move either forwards or backwards relative to the receiving container 134. Alternatively or additionally, the system 108 may signal the operator to move the grain cart 100 forward or backward (that is, toward the front or toward the rear of the receiving container 134 when the grain cart 100 is positioned parallel to the receiving container 134 for movement in these opposite directions). The grain cart 100 may start moving once and stop moving once with several slowdown periods in between or the grain cart 100 may come to a complete stop one or more times between the initial start of grain cart movement and the final stop of the grain cart 100. The system 108 would sense the mound being formed by the filling operation at one spot or location in the receiving container 134 for example, during a slowdown period or while at a complete stop, and determine when the mound reaches a predetermined height. At this time, the system 108 would provide a signal to an autonomous drive system and/or to the operator and the grain cart 100 would be moved accordingly in order to fill at a different location in the receiving container 134. As mentioned, the grain cart 100 could be moved by the operator driving the tractor towing the grain cart 100 and/or the grain cart 100 could be automatically moved by an autonomous drive system. This automatic feedback system will further ensure that the entire receiving container 134 is filled more completely and quickly by moving the grain transfer element 142 both independent of the grain cart movement and by the use of grain cart movement in an automatic or at least semi-automatic manner.

Referring to FIGS. 1 and 5, exemplary methods of operating an automated grain unloading system 108 according to at least some aspects of the present disclosure are described below and may include optional and/or alternative structures and/or operations. Although the corresponding description focuses on the use of the system 108 in connection with transferring grain from the grain cart 100 to the grain hopper trailer 126, it will be appreciated that generally similar operations may be utilized when transferring grain between other types of equipment, such as generally from any supplying container 132 to any receiving container 134. Generally, unless specifically indicated otherwise, the various operations described below may be automatically performed or directed by the processor 194, such as instructed by software or firmware.

Referring to FIGS. 1, 2, 4, 7, and 8, an exemplary grain cart 100 may be prepared for use, such as by coupling the grain cart 100 to a tractor 124 using a hitch 200. Additionally, the grain cart's 100 power takeoff connection 202 may be coupled to the tractor's power takeoff. Additionally, hydraulic lines 212, 214 may be connected between the tractor 124 and the grain cart 100. The grain cart 100 may be positioned near a receiving container 134 (e.g., a grain hopper trailer 126). The power takeoff of the tractor 124 or other source of energy (hydraulics) for the grain cart may be started. If necessary, the grain transfer element 142 of the grain cart 100 may be extended from a folded position to an unloading position to prepare the grain transfer element 142 to unload grain 102. While approaching or near the receiving container 134, the operator may specify a maximum unload weight limit, if desired, and/or may direct the system 108 to commence a grain transfer operation, such as via the user interface 198. Alternatively, the maximum unload weight limit may be specified by the system 108 automatically when the unload location is detected, for example, by one or more location sensors (such as, e.g., GPS, RFID, etc.). The maximum unload weight limit may be selected based on the weight capacity of the receiving container 134 (e.g., grain-hopper trailer 126), for example. In alternative embodiments, the system 108 may determine the maximum unload weight limit by performing a calculation, for example. In some embodiments, the system 108 may select the maximum unload weight from a list of stored values, for example. An operator may use a graphical user interface, such as the iFarm app for example, to use the automated unload function or to turn it off to allow for manual unloading. The operator may engage the tractor's PTO which drives the unloading conveyor 130 (an auger, for example) to turn, and the operator adjusts the tractor's throttle to a proper PTO speed, approximately 1000 rpm, for example.

The operator may use a tablet or smart phone, for example, loaded with the software or firmware app (such as the iFarm app, for example) to input data in the app for grain information (type, moisture, etc.) and desired fill level or unload weight. The operator then turns on the autonomous unload function (turned off manual mode) and selects autonomous unload start.

Referring to FIGS. 3, 4, 7, and 8, the system 108 activates the sensor 144, and attempts to detect a portion of the receiving container 134. If a portion of the receiving container 134 is not detected, the system 108 may wait to proceed until a portion of the receiving container 134 detected and/or the system 108 may alert the operator, such as via the user interface 198. The spout position sensor 186 will detect the position and/or orientation of the grain transfer element 142 and/or spout 176 and the system 108 will compare the orientation of the grain transfer element 142 and/or spout 176 and the detected portion of the receiving container 134. The sensor 144, which may attempt to detect the upper perimeter 136 of the receiving container 134. The system 108 may identify the near upper perimeter edge 154 and the far upper perimeter edge 156 and/or may confirm that both the near upper perimeter edge 154 and the far upper perimeter edge 156 are present within the field of view 146. If either the near upper perimeter edge 154 or the far upper perimeter edge 156 is not detected within the field of view 146, the system 108 may wait to proceed until they are both detected and/or the system 108 may alert the operator, such as via the user interface 198.

The system 108 may determine the location of a longitudinal centerline 204 of the receiving container 134, such as generally at the midpoint 206 of a lateral dimension 208 between the near upper perimeter edge 154 and the far upper perimeter edge 156. The system 108 may actuate the spout articulation mechanism 178 to position the spout 176 such that, when the grain 102 is discharged, the grain 102 will go into the receiving container 134 at a location approximately along the centerline 204. If the spout 176 cannot be positioned so that discharged grain 102 will go into the receiving container 134 near the centerline 204, such as due to limitations on the extent of moving of the spout 176 with the spout articulation mechanism 178, the system 108 may wait to proceed until the grain cart 100 and/or the receiving container 134 is repositioned, and the operator may be notified. The system 108 may be configured to automatically move the spout 176 as necessary during the grain transfer operation to maintain the discharge of grain 102 generally near the centerline 204, even if the grain cart 100 is moved relative to the receiving container 134 and/or if the spout 176 is moved left or right (if capable). Thus, the system 108 may be configured to discharge the grain 102 generally at the centerline 204 even when the grain cart 100 and the receiving container 134 are not positioned precisely in parallel and/or are oriented somewhat transversely with respect to one another.

Referring again to FIGS. 3, 4, 7, and 8, the system 108 may determine whether an left upper perimeter edge 158 and/or an right upper perimeter edge 160 are detected within the field of view 146. If a left upper perimeter edge 158 and/or a right upper perimeter edge 160 are detected, the system 108 may determine whether the current position of the spout 176 will discharge grain 102 into the receiving container 134. If the spout articulation mechanism 178 is configured to move the spout 176 so as to direct the discharge stream of grain 102 generally left and/or right, the spout articulation mechanism 178 may position the spout 176 to discharge grain 102 into the receiving container 134 (if it would otherwise be spilled) and/or the spout articulation mechanism 178 may position the spout 176 to discharge grain 102 into a desired portion of the receiving container 134. For example, in some circumstances, it may be desirable to fill a receiving container front portion first, then a rear portion, then a middle portion. If the spout 176 cannot be moved generally left and/or right to direct the discharged grain 102 into the receiving container 134, the system 108 may wait to proceed until the grain cart 100 and/or the receiving container 134 is repositioned, and the operator may be notified. Similarly, if the spout 176 is not movable generally left and/or right and the spout 176 is positioned such that grain 102 discharged from the spout 176 would spill, the system 108 may wait to proceed until the grain cart 100 and/or the receiving container 134 is repositioned, and the operator may be notified.

Once the system 108 has been directed to commence the grain transfer operation by the operator and the spout 176 is positioned to discharge the grain 102 into the receiving container, the system 108 may begin unloading the grain cart 100. If not already started, the grain transfer element 142 may begin operating. For example, the power takeoff may be engaged and/or a selectively engageable mechanical element 192 may be engaged. If equipped with a metering gate 190, the metering gate 190 may be at least partially opened to allow grain 102 to flow to grain transfer element 142. Grain 102 may be discharged into the receiving container 134. During the grain transfer operation, the sensor 144 may monitor the grain mounds 140*a*, 140*b* and the upper perimeter 136 of the receiving container 134. The system 108 may continuously monitor the grain mound 140*a*, 140*b* inside of the receiving container 134 and change the position of the discharge spout 176 as needed to optimally fill the receiving container 134.

Referring to FIGS. 4 through 8, when the section or portion of the receiving container 134 that the discharge spout 176 can reach is nearing full, the system 108 alerts the operator, through the tablet or smart phone app (iFarm app for example), which direction the grain cart 100 would optimally be moved next and approximately how soon its current location will be full (how soon to move the grain cart 100). The discharge spout 176 and/or grain transfer element 142 may include a human readable LED or other indicator 210 that could be utilized to display text or other perceptible indications to the operator as the operator typically are watching the discharge spout 176 as the grain cart 100 unloads. If the operator does nothing (grain cart 100 is not moved for example), when the grain height is full or the unload weight is reached, the system 108 may close the metering gate 190, see FIG. 9, to stop the unloading of grain 102. If the operator moves the grain cart 100 to a new position (regardless of direction indicated as optimal to the operator), the system 108 will continue to operate as described herein.

Referring to FIGS. 3, 4, 5, 7, and 8, if, at any time during the grain transfer operation, the system 108 determines that the spout 176 is positioned such that the grain 102 may be discharged outside of the receiving container 134, the system 108 may stop the transfer of grain 102. For example, the system 108 may shut the metering gate 190 and/or disengage the selectively engageable mechanical element 192, such as disengaging the PTO of the tractor 124 to further minimize the grain 102 being spilled. The system 108 may run predictive calculations to shut the metering gate 190 preemptively and/or kill the PTO depending on the rate at which the discharge spout 176 approaches an edge of the receiving container 134 as well as the proximity to the edge of the receiving container 134.

Alternatively, if the system 108 determines the spout 176 is movable by the spout articulation mechanism 178 to a position at which the grain 102 would be discharged into the receiving container 134, the system 108 may move the spout 176 using the spout articulation mechanism 178.

If, at any time during the grain transfer operation, the system 108 determines that the grain mound upper surface 138*a*, 138*b* has reached a volumetric fill limit, the system 108 may stop the transfer of grain 102. For example, the system 108 may monitor the freeboard 174*a*, 174*b* on the far wall 172 of the receiving container 134. If the detected freeboard 174*a*, 174*b* reaches a predetermined minimum limit (which may be set by the operator), the system 108 may stop the transfer of grain 102. Alternatively, if the system 108 determines the spout 176 is movable by the spout articulation mechanism 178 to a position at which the grain 102 would be discharged into a portion of the receiving container 134 at which the freeboard 174*a*, 174*b* is above the minimum limit, the system 108 may move the spout 176 using the spout articulation mechanism 178.

Referring to FIGS. 4 through 8, in some embodiments, the system 108 may be configured to provide a perceptible indication directing the operator to reposition the grain cart 100 with respect to the receiving container 134. For example, when filling a generally elongated grain-hopper trailer 126, the operator may move the grain cart 100 generally along the side of the grain-hopper trailer 126 to discharge grain 102 along most or all of the length of the receiving container 134. In some embodiments, the system 108 may be configured to stop and restart the flow of grain 102 automatically as the grain cart 100 is repositioned with respect to the receiving container 134. It will be appreciated that, in some circumstances, similar operations may be conducted with the grain cart 100 remaining stationary and the receiving container 134 moving to allow various portions of the receiving container 134 to be filled.

In the illustrative system 108, the operator may set and/or adjust the freeboard minimum limit, such as by using the user interface 198. The freeboard minimum limit may be specified as a vertical distance (e.g., using distance measurement units) and/or using a proportional numerical scale (e.g., 1-10). In some embodiments, the freeboard minimum limit may be determined by the operator specifying the type of grain 102 being transferred (e.g., rice-wet, rice-medium, or rice-dry) and/or the system 108 may determine an appropriate freeboard minimum limit based on the expected heap angle. Generally, the freeboard minimum limit may be set so that the risk of spillage during transport of the receiving container 134 is minimized, while also maximizing the use of the volume of the receiving container 134.

If, at any time during the grain transfer operation, the system 108 determines that the weight of the grain 102 unloaded during the current grain transfer operation has reached the maximum unload weight limit specified by the operator, the system 108 may stop the transfer of grain 102. For example, the system 108 may calculate the difference between a measured loaded weight and a measured current weight to determine an amount of grain 102 that has been unloaded. When the set unload weight or fill height is reached, the system 108 may close the metering gate 190, returns the discharge spout 176 to its starting orientation, turns off the autonomous unload function and notifies the operator through the iFarm app, for example. The system 108 may partially close the metering gate 190 to slow the unload rate when the receiving container 134 is nearing full and/or approaching the desired load weight. The system 108 may partially close the metering gate 190 to slow the unload rate when the grain cart 100 is approaching the desired unload weight.

Accordingly, by utilizing an automated grain cart unloading system, such as the illustrative system 108, the risk of grain spillage during grain transfer operations may be reduced and the ease with which a receiving container may be loaded fully and/or evenly may be improved. As such, operators may operate equipment, such as grain carts 100, with less risk of spillage which may reduce mental stress and/or fatigue. The improved ease of unloading also allows less experienced operators to more confidently operate equipment. Further, conditions that impede visibility of the grain unloading process for the grain cart operator may have less impact or introduce less risk of spillage. Further still, exemplary systems reducing the risk of spillage may facilitate operation of the unloading equipment (e.g., unloading conveyor 130) at high rate (e.g., about 1000 bushels per minute) rather than at a reduced rate (e.g., less than about 500 bushels per minute).

Exemplary methods of manufacturing a grain cart 100 according to at least some aspects of the present disclosure may include installing and/or operatively connecting various components of the illustrative system 108 as described herein.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A grain cart comprising:

a grain tank;

a grain transfer element configured to transfer grain from the grain tank to a receiving container, the grain transfer element including a movable spout configured to direct a stream of discharged grain;

a first sensor configured to detect an interface between an upper surface of a grain mound in the receiving container and an interior surface of a wall of the receiving container, the first sensor is further configured to detect at least a portion of an upper edge of the wall;

a second sensor configured to detect an orientation of the movable spout; and a processor configured to compare the detected interface and the detected portion of the upper edge to the detected orientation of the movable spout, and the processor is further configured to control the operation of the grain transfer element to direct a transfer of grain from the supplying container to the receiving container based at least in part on a result of the comparison of the detected interface and the detected portion of the upper edge to the detected orientation of the movable spout.

2. The grain cart of claim 1, wherein the first sensor is further configured to detect at least a portion of the upper surface of the grain mound in the receiving container, wherein the processor is further configured to compare the detected portion of the upper edge and the detected portion of the upper surface, and wherein the controlled operation of the grain transfer element is based at least in part on a result of the comparison of the detected portion of the upper edge and the detected portion of the upper surface.

3. The grain cart of claim 1, wherein the first sensor is further configured to detect at least a portion of the upper surface of the grain mound in the receiving container, wherein the processor is further configured to compare the detected orientation of the grain transfer element and the detected portion of the upper surface, and wherein the controlled operation of the grain transfer element is based at least in part on a result of the comparison of the detected orientation of the movable spout and the detected portion of the upper surface.

4. The grain cart of claim 1, wherein the processor is further configured to determine a freeboard by calculating a vertical distance between the detected interface and the detected portion of the upper edge; and wherein the controlled operation of the grain transfer element is based at least in part on the freeboard.

5. The grain cart of claim 4, wherein the processor is further configured to determine a minimum freeboard by calculating a vertical distance between a highest point of the detected interface and a lowest point of the detected portion of the upper edge, and the processor is further configured to compare the freeboard to the minimum freeboard;

wherein the controlled operation of the grain transfer element is based at least in part on a result of the comparison of the freeboard to the minimum freeboard.

6. The grain cart of claim 1, wherein the processor is further configured to control the orientation of the movable spout to direct the stream of discharged grain can laterally farther away from the grain cart and laterally nearer to the grain cart.

7. The grain cart of claim 6, wherein the grain cart includes a forward portion and a rearward portion, and wherein the processor is further configured to control the orientation of the movable spout to direct the stream of discharged grain generally forwardly or generally rearwardly with respect to the grain cart.

8. The grain cart of claim 1, wherein the grain cart includes a forward portion and a rearward portion, and wherein the processor is further configured to control the orientation of the movable spout to direct the stream of discharged grain generally forwardly or generally rearwardly with respect to the grain cart.

9. The grain cart of claim 1, wherein the processor is further configured to control the orientation of the movable spout to direct the stream of discharged grain.

10. The grain cart of claim 1, wherein the processor is further configured to prevent a discharge of grain via the grain transfer element if the processor determines that the grain would not be discharged into the receiving container.

11. The grain cart of claim 1, wherein the processor is further configured to provide a perceptible indication that the first sensor has not detected at least a portion of an upper edge of the wall.

12. The grain cart of claim 1, wherein the processor is further configured to provide a perceptible indication to move the grain cart to position the movable spout relative to the receiving container.

13. The grain cart of claim 1, wherein the processor is further configured to evaluate a position of the movable spout relative to the receiving container, and wherein the processor provides a perceptible indication to move the grain cart to position the movable spout relative to the receiving container based at least in part on the position of the movable spout relative to the receiving container.

14. The grain cart of claim 1, wherein the at least one sensor is further configured to detect at least a portion of the upper surface of the grain mound in the receiving container, wherein the processor is further configured to evaluate a position of the movable spout relative to the detected portion of the upper surface, and wherein the processor provides a perceptible indication to move the grain cart to position the movable spout relative to the receiving container based at least in part on the position of the movable spout relative to the detected portion of the upper surface.

15. The grain cart of claim 1, wherein at least one of the grain cart or the receiving container includes a scale element configured to detect a weight of the grain in at least one of the grain tank or the receiving container, and wherein the processor is further configured to direct the transfer of grain based at least in part on the detected weight of the grain in at least one of the grain tank or the receiving container.

16. The grain cart of claim 1, wherein the grain transfer element comprises a grain transfer control element configured to adjust a grain transfer rate, and wherein the processor is further configured to control the grain transfer control element to adjust the grain transfer rate.

17. The grain cart of claim 16, wherein the grain transfer control element comprises a movable gate operatively interposing the grain tank and the grain transfer element, and the processor is further configured to direct positioning of the movable gate.

18. The grain cart of claim 1, further comprising a data storage device operatively connected to the processor and configured to at least one of store instructions for the processor or store data associated with operation of the system.

19. The grain cart of claim 1, further comprising a user interface device including at least one of a wired device or a wireless device, operatively connected to the processor, and configured to enable a user to operate the system.

20. The grain cart of claim 19, wherein the user interface device comprises at least one of a smart phone, a tablet computer, a laptop computer, or a control panel.

21. The grain cart of claim 19, wherein the user interface device is configured to provide a perceptible indication to the user.

22. The grain cart of claim 19, wherein the user interface device comprises a graphical user interface.

23. The grain cart of claim 1 further comprising an autonomous drive system;

wherein the processor is further configured to at least partially direct the operation of the autonomous drive system.

24. A grain cart comprising:

a grain tank;

a grain transfer element configured to transfer grain from the grain tank to a receiving container, the grain transfer element including a movable spout configured to direct a stream of discharged grain;

a first sensor configured to detect at least a portion of the receiving container;

a second sensor configured to detect an orientation of the movable spout; and a processor configured to compare the detected portion of the receiving container and the detected orientation of the movable spout, and the processor is further configured to control the operation of the grain transfer element to direct a transfer of grain from the grain tank to the receiving container based at least in part on a result of the comparison of the detected portion of the receiving container and the detected orientation of the movable spout.

25. The grain cart of claim 24, wherein the first sensor is further configured to detect at least a portion of an upper surface of a grain mound in the receiving container, wherein the processor is further configured to compare the detected portion of the receiving container and the detected portion of the upper surface, and wherein the controlled operation of the grain transfer element is based at least in part on a result of the comparison of the detected portion of the receiving container and the detected portion of the upper surface.

26. The grain cart of claim 24, wherein the first sensor is further configured to detect at least a portion of an upper surface of a grain mound in the receiving container, wherein the processor is further configured to compare the detected orientation of the movable spout and the detected portion of the upper surface, and wherein the controlled operation of the grain transfer element is based at least in part on a result of the comparison of the detected orientation of the movable spout and the detected portion of the upper surface.

27. The grain cart of claim 24, wherein the first sensor is further configured to detect an interface between an upper surface of a grain mound in the receiving container and an interior surface of a wall of the receiving container, and the first sensor is further configured to detect at least a portion of an upper edge of the wall, and wherein the processor is further configured to compare the detected interface and the detected portion of the upper edge to the detected orientation of the movable spout, and control the operation of the grain transfer element to direct a transfer of grain from the grain tank to the receiving container based at least in part on a result of the comparison of the detected interface and the detected portion of the upper edge to the detected orientation of the movable spout.

28. The grain cart of claim 27, wherein the processor is further configured to determine a freeboard by calculating a vertical distance between the detected interface and the detected portion of the upper edge of the wall;

wherein the controlled operation of the grain transfer element is based at least in part on the freeboard.

29. The grain cart of claim 28, wherein the processor is further configured to determine a minimum freeboard by calculating a vertical distance between a highest point of the detected interface and a lowest point of the detected portion of the upper edge, and the processor is further configured to compare the freeboard to the minimum freeboard;

wherein the controlled operation of the grain transfer element is based at least in part on a result of the comparison of the freeboard to the minimum freeboard.

30. The grain cart of claim 24, wherein the processor is further configured to control the orientation of the movable spout to direct the stream of discharged grain laterally farther away from the grain cart and laterally nearer to the grain cart.

31. The grain cart of claim 24, wherein the grain cart includes a forward portion and a rearward portion, and wherein the processor is further configured to control the orientation of the movable spout to direct the stream of discharged grain generally forwardly and generally rearwardly with respect to the grain cart.

32. The grain cart of claim 31, wherein the processor is further configured to control the orientation of the movable spout to direct the stream of discharged grain laterally farther away from the grain cart and laterally nearer to the grain cart.

33. The grain cart of claim 24, wherein the processor is further configured to control the orientation of the movable spout to direct the stream of discharged grain.

34. The grain cart of claim 24, wherein the processor is further configured to prevent a discharge of grain via the movable spout if the processor determines that the grain would not be discharged into the receiving container.

35. The grain cart of claim 24, wherein the processor is further configured to provide a perceptible indication that the first sensor has not detected at least a portion of the receiving container.

36. The grain cart of claim 24, wherein the processor is further configured to provide a perceptible indication to move the grain cart to position the movable spout relative to the receiving container.

37. The grain cart of claim 24, wherein the processor is further configured to evaluate a position of the movable spout relative to the receiving container, and wherein the processor provides a perceptible indication to move the grain cart to position the movable spout relative to the receiving container based at least in part on the position of the movable spout relative to the receiving container.

38. The grain cart of claim 24, wherein the first sensor is further configured to detect at least a portion of an upper surface of a grain mound in the receiving container, wherein the processor is further configured to evaluate the position of the movable spout relative to the detected portion of the upper surface, and wherein the processor is further configured to provide a perceptible indication to move the grain cart to position the movable spout relative to the receiving container based at least in part on the position of the movable spout relative to the detected portion of the upper surface.

39. The grain cart of claim 24, wherein at least one of the grain cart or the receiving container includes a scale element configured to detect a weight of the grain in at least one of the grain tank or the receiving container, and wherein the processor is further configured to direct the transfer of grain based at least in part on the detected weight of the grain in at least one of the grain tank or the receiving container.

40. The grain cart of claim 24, wherein the grain transfer element comprises a grain transfer control element configured to adjust a grain transfer rate, and wherein the processor is further configured to control the grain transfer control element to adjust the grain transfer rate.

41. The grain cart of claim 40, wherein the grain transfer control element comprises a movable gate operatively interposing the grain tank and the grain transfer element, and wherein the processor is further configured to direct positioning of the movable gate.

42. The grain cart of claim 24, further comprising a data storage device operatively connected to the processor and configured to at least one of store instructions for the processor or store data associated with operation of the system.

43. The grain cart of claim 24, further comprising a user interface device including at least one of a wired device or a wireless device, operatively connected to the processor, and configured to enable a user to operate the system.

44. The grain cart of claim 43, wherein the user interface device comprises at least one of a smart phone, a tablet computer, a lap top computer, or a control panel.

45. The grain cart of claim 43, wherein the user interface device is configured to provide a perceptible indication to the user.

46. The grain cart of claim 43, wherein the user interface device comprises a graphical user interface.

47. The grain cart of claim 24 further comprising an autonomous drive system;

wherein the processor is further configured to at least partially direct the operation of the autonomous drive system.

* * * * *